(12) United States Patent
Lignon

(10) Patent No.: US 9,103,672 B2
(45) Date of Patent: Aug. 11, 2015

(54) GYROSCOPIC MEASUREMENT BY A GYROSCOPE VIBRATING IN PRECESSION

(75) Inventor: Christian Lignon, Paris (FR)

(73) Assignee: SAGEM DEFENSE SÉCURITÉ, Boulogne-Billancourt (FR)

(*) Notice: Subject to any disclaimer, the term of this patent is extended or adjusted under 35 U.S.C. 154(b) by 320 days.

(21) Appl. No.: 13/641,460

(22) PCT Filed: Apr. 18, 2011

(86) PCT No.: PCT/FR2011/050891
§ 371 (c)(1),
(2), (4) Date: Oct. 15, 2012

(87) PCT Pub. No.: WO2011/128606
PCT Pub. Date: Oct. 20, 2011

(65) Prior Publication Data
US 2013/0031978 A1 Feb. 7, 2013

(30) Foreign Application Priority Data
Apr. 16, 2010 (FR) .................................. 10 01627

(51) Int. Cl.
*G01P 21/00* (2006.01)
*G01P 21/02* (2006.01)
*G01P 3/44* (2006.01)
(Continued)

(52) U.S. Cl.
CPC ............... *G01C 19/56* (2013.01); *G01C 25/00* (2013.01); *G01C 25/005* (2013.01); *G01P 3/44* (2013.01); *G01P 21/00* (2013.01)

(58) Field of Classification Search
USPC ............... 73/504.12, 504.08, 504.18, 504.16, 73/504.02, 1.77
See application file for complete search history.

(56) References Cited

U.S. PATENT DOCUMENTS

2005/0022596 A1* 2/2005 Lehureau et al. .......... 73/504.12
2010/0095771 A1* 4/2010 Lignon ...................... 73/504.12

FOREIGN PATENT DOCUMENTS

EP      1 491 856 A1    12/2004
EP      1 571 417 A2    9/2005
(Continued)

OTHER PUBLICATIONS

Shkel et al., "Type I and Type II Micromachined Vibratory Gyroscopes," IEEE, 2006.
(Continued)

*Primary Examiner* — Eric S McCall
*Assistant Examiner* — Anthony W Megna Fuentes
(74) *Attorney, Agent, or Firm* — Marshall, Gerstein & Borun LLP

(57) ABSTRACT

Gyroscopic measurements are provided, by a system comprising a vibrating gyroscope, in the form of an output signal. The vibrating gyroscope provides an original measurement signal. A periodic control signal (CP) is applied to it over a time period, which signal is suitable: for rotating the geometric position of vibration in a first direction, during a part of the time period; and for rotating the geometric position of vibration in a second direction opposite to the first direction, during the other part of the time period; said control signal having a zero mean over said time period and exhibiting portions of signal at high frequency relative to the output signal; said output signal being based on a corrected signal emanating from the original measurement signal; in which the corrected signal is based on an identification of errors made during the signal portions at high frequency.

18 Claims, 6 Drawing Sheets

(51) Int. Cl.
*G01C 25/00* (2006.01)
*G01C 19/56* (2012.01)

(56) References Cited

FOREIGN PATENT DOCUMENTS

| FR | 2 755 227 | A1 | 4/1998 |
|----|-----------|-----|--------|
| FR | 2 904 870 | A1 | 2/2008 |
| FR | 2 925 669 | A1 | 6/2009 |
| WO | WO-2009/083519 | A1 | 7/2009 |

OTHER PUBLICATIONS

International Search Report for PCT/FR2011/050891, mailed Jun. 27, 2012.

* cited by examiner

GYROSCOPIC MEASUREMENT BY A GYROSCOPE VIBRATING IN PRECESSION

FIELD OF THE INVENTION

The invention relates to vibrating gyroscopes using a principle based on the Coriolis effect, and relates more particularly to the accuracy of measurements provided by this type of gyroscope.

BACKGROUND OF THE INVENTION

Such vibrating gyroscopes are conventionally used in inertial systems intended for navigation, such as a gyrocompass, for example, which provides an angle of measurement relative to the reference direction of true north (heading).

Axisymmetric Coriolis Vibrating Gyroscopes (CVG), for example Hemispherical Resonance Gyroscopes (HRG) more generally referred to as type I, such as those described in 'Type I and Type II micromachined vibrating gyroscopes' by Andrei M. Shkel, pages 586-593, IEEE/ION (Institute of Electrical and Electronics Engineer/Institute Of Navigation), PLANS 2006, San Diego, Calif., USA, operate in an open loop and allow measuring an absolute angle of rotation on the basis of a measurement of an angle representing the geometric position of vibration of the gyroscope relative to measurement electrodes.

Such a gyroscope may also be used in a closed loop, by controlling the geometric position of vibration via a precession control as is described in particular in document FR 2 755 227.

In that case, the geometric position of vibration of the gyroscope is maintained in a fixed position, and the measurement is deduced from the control that must be applied to the gyroscope to maintain it in that fixed geometric position of vibration. This type of operation is also called "rate gyro feedback." The values supplied by the physical measurement then no longer correspond to an angle but to a speed of rotation.

Whether used in open or closed loop, the measurements provided by these vibrating gyroscopes may contain errors which are particularly affected by the position of the vibration relative to the measurement electrodes. These errors therefore vary with the geometric position of vibration, and have the effect of degrading the level of precision of the values so measured. It is therefore useful to attempt to reduce these errors in order to improve the performance of this type of gyroscope.

SUMMARY OF THE INVENTION

The invention aims to improve the situation.

A first aspect of the invention proposes a method of gyroscopic measurement in the form of an output signal supplied by a gyroscopic system comprising a vibrating gyroscope; said gyroscope vibrating in a first initial geometric position of vibration and supplying an original measurement signal; wherein a periodic control signal is applied to the vibrating gyroscope over a time period, in order to:
rotate the geometric position of vibration in a first direction, during a portion of the time period, according to a first speed profile, causing a change in the position of the vibration of said gyroscope from the first geometric position of vibration to a second geometric position of vibration; and
rotate the geometric position of vibration in a second direction opposite the first direction, during the other portion of the time period, according to a second speed profile, causing a change in the position of the vibration of said gyroscope from the second geometric position of vibration to a third geometric position of vibration;
the first and second speed profiles generating a variation in the speed of the change of geometric position of vibration over time;
said control signal having a zero mean over said time period;
said output signal being based on a corrected signal issuing from the original measurement signal;
wherein the corrected signal is based on error identification conducted, in the high frequency signal portions, by comparing the corrected signal with the original measurement signal from which the control signal has been subtracted.

In one embodiment of the invention, a gyroscopic system comprises a vibrating gyroscope supplying a measurement signal representing a variation in its geometric position of vibration over time.

The term "geometric position of vibration" of a gyroscope is understood to mean the position of the standing wave. FIG. 1 illustrates such a standing wave.

The wave illustrated here has four nodes a, b, c, d and four anti-nodes e, f, g, h around the periphery of a hemispherical resonator 101. These four anti-nodes and four nodes alternate and are uniformly spaced forty-five degrees apart. The nodes are the points of minimum displacement on the standing wave, and the anti-nodes are the points of maximum displacement on the standing wave. The operation of the hemispherical resonance gyroscope requires accurate monitoring of the movement of the standing wave, which in turn requires that the location of the nodes and anti-nodes be accurately determined.

The position of this standing wave or the geometric position of vibration of a gyroscope can be made to rotate, so that the illustrated nodes and anti-nodes are not positioned as illustrated, but are shifted.

Advantageously, a periodic control signal can be applied over a time period to this gyroscope, in order to rotate the geometric position of vibration of the gyroscope in a first direction, during a portion of the time period and according to a first speed profile, then in an opposite direction according to a second speed profile. Thus the measurement signal supplied by the vibrating gyroscope is based on measurements made in different geometric positions of vibration, such that the measurement errors related to the geometric positions of vibration of the vibrating gyroscope can be canceled out or averaged. In addition, the periodic control signal which was applied to this measurement signal supplied by the vibrating gyroscope can be subtracted so as to ultimately obtain corrected gyroscopic measurements.

Such a periodic control signal may correspond to a change, over a time period, in the geometric position of vibration in a first direction from the first to the second geometric position of vibration, this change in the geometric position of vibration occurring according to the first speed profile, then to a change in the geometric position of vibration in a second direction from the second to a third geometric position of vibration, this change of position occurring according to the second speed profile. Each of these speed profiles indicates a variation over time of the rotation speed applied to the geometric position of vibration via the control signal according to an embodiment of the invention.

In the case where the vibrating gyroscope concerned is only subjected to the control signal, the third position of vibration substantially corresponds to the first position of vibration. However, this may not be the case when the vibrating gyroscope also undergoes a physical rotation related to the actual movement of the carrier to which it is attached, for example.

By proceeding in this way, the original measurement signal supplied by the vibrating gyroscope to which this control signal is applied is based on measurements made in different geometric positions of vibration, such that the measurement errors related to the geometric positions of vibration of the vibrating gyroscope can be canceled out or at least averaged, as the control signal has a zero mean.

It is also arranged here to reduce certain residual errors that may still affect the measurements supplied by the vibrating gyroscope, and thus obtain a corrected signal which allows supplying gyroscopic measurements in the form of a reliable output signal. For this purpose, error identification is advantageously performed on the basis of a comparison between the control signal and the corrected signal from the previous iteration which is received via feedback loop. Thus the corrected signal comes from the original measurement signal from which the control signal is subtracted (the precession based on the control signal allows averaging the errors), additionally corrected for residual errors which can advantageously be identified by comparison with the ultimately corrected signal (for example by measurements from other gyroscopes of the gyroscopic system and/or an external measurement entity).

It may be arranged that the gyroscopic system additionally comprises an external measurement entity, and the error identification takes into account measurements supplied by this external measurement entity.

In an embodiment of the invention, the control signal presents signal portions of high frequency relative to the output signal, and the error identification is conducted during the high frequency portions of the control signal.

Advantageously, by proceeding in this manner, the signal portions of the control signal that are high frequency relative to the output signal (meaning relative to the movement of the carrier of the gyroscopic system) allow distinguishing, within the measurements done by the vibrating gyroscope, the portion which concerns the control signal from the portion which concerns the actual movement to be measured. More specifically, a measurement signal from the vibrating gyroscope (or more specifically the original measurement signal minus the applied control signal) is compared with the corrected signal injected by the feedback loop, in the time periods during which the control signal is of relatively high frequency compared to the signal frequency.

Advantageously, during the time periods in which the control signal is high frequency compared to the output signal, it is easy to dissociate, or decorrelate, the actual movements of the carrier of the gyroscopic system from the control signal within the original measurement signal. It is then possible to distinguish the error related to the vibrating gyroscope from the actual movements measured by this vibrating gyroscope. Under these conditions, the vibrating gyroscope is excited by a control signal at a higher frequency than the actual movements to be measured, which allows making the distinction between the errors to be attributed to the measurements made and the actual movement to be measured.

The high frequency signal portions in the control signal may correspond to reversals of direction of the control signal.

In this manner it is possible to obtain time periods close to the moments when the control signal reverses, during which the control signal is high frequency relative to the movement of the carrier to which the gyroscopic system is attached. Such is particularly the case when the carrier is a boat, for example, where the reversals of direction of the control signal are abrupt.

In an embodiment of the invention, the gyroscopic system additionally comprises an external measurement entity, and the error identification takes into account the measurements supplied by the external measurement entity during the signal portions of the control signal which are not high frequency relative to the output signal.

With these characteristics, it is possible to identify errors related to the vibrating gyroscope by comparison with the measurements supplied by the external measurement entity in order to increase the reliability of the output signal, even in the case where the control signal does not have a period of high frequency relative to the output signal supplied by the gyroscopic system.

This embodiment can be very advantageous when the carrier of the gyroscopic system is an airplane, as its movements can include abrupt changes of direction and these could occur during the high frequency periods of the control signal.

This external measurement entity may be an additional gyroscope.

In an embodiment of the invention, this additional gyroscope is a second vibrating gyroscope of the system, and an additional control signal is applied to it. This additional control signal presents signal portions of high frequency relative to the output signal, which are time-shifted relative to the high frequency signal portions of the control signal that is applied to the first vibrating gyroscope.

Here, first and second vibrating gyroscopes are provided which are respectively subjected to control signals that do not have high frequency signal portions at the same periods. The high frequency signal portions are not simultaneous because they are time-shifted relative to each other. With this time shift between the respective high frequency signal portions of the two control signals, one can continue to distinguish at least one of the two control signals from the movement of the carrier, even if at certain moments the other control signal may be of a frequency similar to that of the movement of the carrier.

In an embodiment of the invention, the gyroscopic system comprises, in addition to the vibrating gyroscope, second and third vibrating gyroscopes each supplying an original measurement signal. In addition, respective periodic control signals are applied over a time period to each of the second and third vibrating gyroscopes, in order to:

rotate the geometric position of vibration in a first direction, during a portion of the time period, according to a first speed profile, causing a change in the position of vibration from the first geometric position of vibration to a second geometric position of vibration; and rotate the geometric position of vibration in a second direction opposite the first direction, during the other portion of the time period, according to a second speed profile, causing a change in the position of vibration from the second geometric position of vibration to a third geometric position of vibration;

said control signals having a zero mean over said time period and presenting signal portions of high frequency relative to the output signal which are time-shifted relative to each other;

said output signal being based on corrected signals respectively issuing from intermediate measurement signals;

wherein each of the corrected signals is based on error identification conducted, during the high frequency signal portions of the corresponding control signal, by comparing the corresponding original measurement signal from which the corresponding control signal has been subtracted, with the corresponding corrected signal.

Under these conditions, it is advantageously possible to obtain a reliable navigation unit at a relatively low cost due to its being based on three vibrating gyroscopes.

It should be noted that the control signals applied to the three vibrating gyroscopes may be similar or may be different.

In an embodiment of the invention, each of said respective corrected signals for each of the vibrating gyroscopes is additionally obtained by taking into account errors identified on the basis of comparing the output signal supplied by the gyroscopic system as a function of the position of vibration, with reference measurements.

Under these conditions, errors are identified while taking into account measurements supplied by the gyroscopic system as a function of the position of vibration and of the control signal. Here, advantageously, a feedback loop is implemented to supply the measurements output by the gyroscopic system in order to observe them as a function of variations in the position of vibration of the system's vibrating gyroscopes and variations in the control signal. With this feedback, each of the corrected signals supplied by one of the vibrating gyroscopes can advantageously also be corrected on the basis of such identified errors.

This feedback loop allows establishing a period for observing and identifying errors in the measurement signals supplied by each of the vibrating gyroscopes of the system, in comparison with reference measurements.

In one embodiment of the invention, the reference measurements are supplied by an external measurement signal.

Errors can thus be identified on the basis of comparing measurements supplied by the system and reference measurements supplied by an external measurement system which is then used as a reference for comparison. This measurement signal may be a GPS for example (Global Positioning System).

In one embodiment, the error identification is determined, for each of the vibrating gyroscopes, on the basis of a Kalman filter given as parameters the position of vibration of the vibrating gyroscope, the control signal, the measurements supplied by the gyroscopic system, and the reference measurements.

It is also possible to make use of a least squares method to identify the errors according to an embodiment of the invention.

The gyroscopic system may comprise three vibrating gyroscopes positioned in a triad, this triad having a trisection oriented on a substantially vertical axis.

The term "substantially vertical" is understood to mean that the trisection has an orientation which is essentially directed vertically, such that projections in the horizontal plane of the velocity components of the gyroscope measurements provide relevant and usable information.

Under these conditions, advantageously, the errors introduced into the measurements supplied by the vibrating gyroscopes of the gyroscopic system can be identified in an equivalent manner for the three vibrating gyroscopes of the gyroscopic system. More specifically, in navigation, the horizontal speed components are the most useful. By having a gyroscopic system as indicated above, it is advantageously possible to obtain horizontal components for the three vibrating gyroscopes in an equivalent manner, by projecting in the horizontal plane the measurements supplied by each one. Thus the identification of errors affecting the measurements supplied by each vibrating gyroscope can be conducted in an appropriate manner, taking into account each of the vibrating gyroscopes of the system.

In one embodiment of the invention, the first and second speed profiles are different for each of the vibrating gyroscopes of the gyroscopic system, these differences allowing the errors associated with the measurements from the three gyroscopes to be decorrelated from each other.

By applying different control signals to the different vibrating gyroscopes, it is advantageously possible to decorrelate the errors affecting their respective measurement signals. In order to introduce differences between the control signals in order to achieve such a decorrelation of the respective errors of the three vibrating gyroscopes, one can modulate the period of the control signal, or period of the precession cycles, or shift the periods of the control signals to be out of phase, i.e., phase shift the precession cycles of the three vibrating gyroscopes.

In one embodiment of the invention, the second speed profile corresponds to the inverse of the first speed profile as a function of time. The applied control signal is therefore symmetrical on each side of the middle of its time period.

In one embodiment, the first and second portions of the time period are identical.

In one embodiment, the measurement signal from the gyroscope and the control signal are expressed similarly to the measurements supplied by the gyroscopic system, either in angle values or in angular velocity values. In that case, it is advantageously unnecessary to perform a signal integration before subtracting the control signal from the measurement signal.

In an embodiment of the invention, the measurements supplied by the gyroscopic system may correspond to angular velocity values, each angular velocity value resulting from the division of a difference between two values for the geometric position of vibration of the corrected signal, separated by a whole number of time periods, by a time value corresponding to the whole number of time periods.

A second aspect of the invention proposes a gyroscopic system comprising:
  a vibrating gyroscope, said gyroscope vibrating in a first initial geometric position of vibration and supplying an original measurement signal;
  a control unit adapted to apply a periodic control signal over a time period, in order to:
    rotate the geometric position of vibration in a first direction, during a portion of the time period, according to a first speed profile, causing a change in the position of vibration of said gyroscope from the first geometric position of vibration to a second geometric position of vibration; and
    rotate the geometric position of vibration in a second direction opposite the first direction, during the other portion of the time period, according to a second speed profile, causing a change in the position of vibration of said gyroscope from the second geometric position of vibration to a third geometric position of vibration,
  a processing unit adapted to supply an output signal on the basis of a corrected signal representing a variation in the geometric position of vibration values and obtained by subtracting the control signal from the original measurement signal supplied by said vibrating gyroscope;
the first and second speed profiles indicating a variation in the speed of the change in geometric position of vibration over time;

said control signal having a zero mean over said time period;
said output signal being based on a corrected signal issuing from the original measurement signal;
wherein the corrected signal is based on error identification conducted by comparing the corrected signal with the original measurement signal from which the control signal has been subtracted.

In an embodiment of the invention, the control signal presents signal portions of high frequency relative to the output signal; and the error identification is conducted during the high frequency signal portions.

The gyroscopic system may additionally comprise an external measurement entity, and measurements supplied by the external measurement entity are taken into account during the signal portions of the control signal which are not high frequency relative to the output signal.

As the additional gyroscope is vibratory, an additional control signal may be applied to the additional gyroscope, said additional control signal presenting signal portions of high frequency relative to the output signal, which are time-shifted relative to the high frequency signal portions of the control signal applied to the vibrating gyroscope of the system.

The gyroscopic system may comprise, in addition to the first vibrating gyroscope, second and third vibrating gyroscopes which each supply an original measurement signal. Respective periodic control signals can thus additionally be applied over the time period to each of the second and third vibrating gyroscopes, via the control unit, in order to:
rotate the geometric position of vibration in a first direction, during a portion of the time period, according to a first speed profile, causing a change in the position of vibration from a first geometric position of vibration to a second geometric position of vibration; and
rotate the geometric position of vibration in a second direction opposite the first direction, during the other portion of the time period, according to a second speed profile, causing a change in the position of vibration from the second geometric position of vibration to a third geometric position of vibration;
said control signals having a zero mean over said time period and presenting signal portions of high frequency relative to the output signal which are time-shifted relative to each other;
said output signal being based on corrected signals respectively issuing from intermediate measurement signals;
wherein each of the corrected signals is based on error identification conducted, during the high frequency signal portions of the corresponding control signal, by comparing the corresponding original measurement signal from which the corresponding control signal has been subtracted, with the corresponding corrected signal.

Other features and advantages of the invention will be apparent from reading the following description. This is purely illustrative and is to be read with reference to the attached drawings, in which:

DETAILED DESCRIPTION

Figure 1:
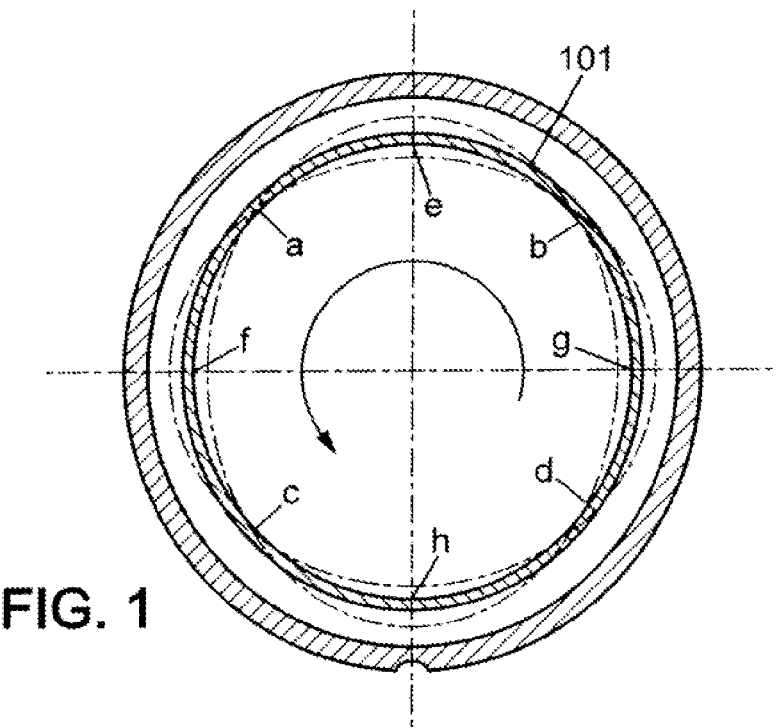
FIG. 1 illustrates a geometric position of vibration of a vibrating gyroscope.
Figure 2:
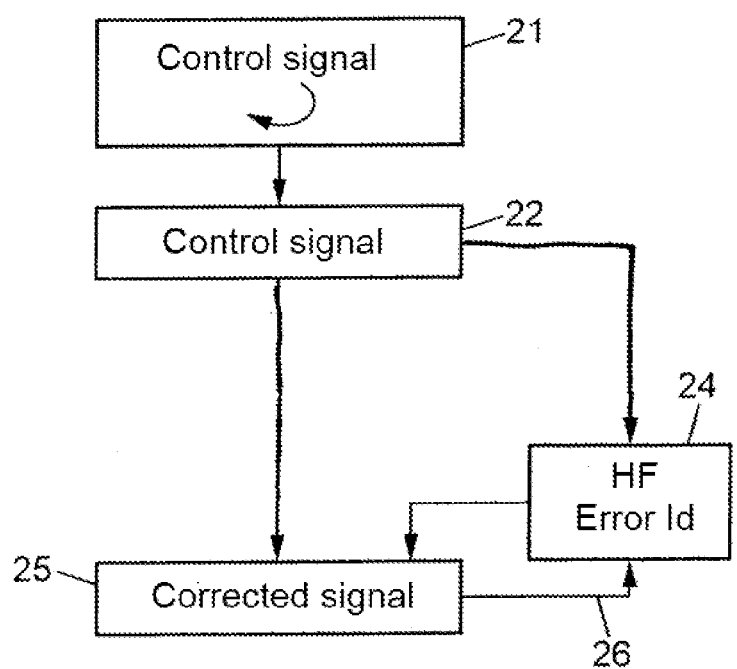
FIG. 2 illustrates the main steps of a measurement method by a gyroscopic system according to an embodiment of the invention.

FIG. 2 illustrates the main steps of a measurement method according to an embodiment of the invention.

In step 21, a periodic control signal is applied in order to rotate the geometric position of vibration in a first direction, during a portion of the period of the periodic control signal. Due to this control signal, the geometric position of vibration of the vibrating gyroscope rotates in a first direction, at a speed which may vary over time according to a first profile. Thus the vibrating gyroscope moves from a first geometric position of vibration to a second geometric position of vibration. This first speed profile may also correspond to a constant speed, in which case the geometric position of vibration then varies in a continuous manner over the concerned portion of the time period.

Then in step 22, a control signal is applied in order to rotate the geometric position of vibration in a second direction opposite the first direction, during the other time period of the control signal. Here the control signal causes the position of the gyroscope vibration to change from the second geometric position of vibration to a third geometric position of vibration (which may correspond to the first position), this change occurring at a speed which may vary over time according to a second speed profile. The control signal has a zero mean over the period of the periodic control signal.

In one embodiment, the second speed profile corresponds to the first speed profile inverted, as a function of time. Thus the first and second speed profiles are symmetrical to each other relative to the center of the time period.

The vibrating gyroscope may then be in the initial geometric position of vibration, i.e., the first geometric position of vibration after step 22, when the vibrating gyroscope is only subjected to the control signal according to an embodiment of the invention.

It should be noted that in an embodiment of the invention, the first and second speed profiles indicate a constant speed over time, therefore with a zero variation, which means that the position of vibration turns at a constant speed in both the first direction and the second direction.

This control signal is therefore a periodic precession signal adapted to apply an alternating precession to the vibrating gyroscope.

Steps 21 and 22 are then repeated to obtain measurements from the vibrating gyroscope concerned over a certain time period while the gyroscope is precessing.

In another step, the control signal is subtracted from the original measurement signal. A corrected signal 25 can then be obtained that is based on an average of the errors as a function of the precession applied, for example in the manner described in FR2925669 (MEASUREMENT BY GYROSCOPIC SYSTEM).

In a possible embodiment, the method applies a rapid precession, meaning a control signal of a high frequency with respect to the frequency of the output signal. This is the same as saying that the change of orientation of the carrier (supporting the gyroscopic system) is slow relative to the precession frequency.

However, if the carrier is very slow (or even immobile), a rapid precession (compared to the movements of the carrier) may seem slow to a human observer.

If a carrier is not moving much (boat), the method may use frequencies on the order of a Hertz, for example. For an airplane parked at an airport, initializing its inertial unit (containing the gyroscopic system which is the object of the method), the alignment time (initialization phase) of the inertial unit may be 300 seconds, for example. The precession frequency may then be on the order of a hundredth of a Hertz for example, meaning that the precession period can be counted in minutes.

Under such conditions, as the movement of the carrier is slow at the scale of the precession period, one can expect a substantially constant measurement from the gyroscope (once the control signal is deducted) at the scale of the precession period (there is no movement or at least negligible movement at this scale), and thus any measured deviation relative to the constant can be considered as needing to be corrected (this may be the case during the alignment of an inertial unit of an airplane in particular).

Different types of gyroscopes may use different precession frequency ranges.

For example, for an HRG gyroscope, in some embodiments this can go up to precession frequencies on the order of about 0.1 Hz. For a MEMS gyroscope, precession frequencies on the order of 10 Hz (several tens of Hertz for example) could be used in certain embodiments.

The method may use a frequency control signal of an order of magnitude that can correspond in certain cases to that of a frequency of the output signal. This can correspond, for example, to a case of an isolated and very rapid change of orientation of the carrier (in the presence of a rapid precession), or a slow movement of the carrier (boat in calm water, parked aircraft, etc.) but with a precession of slow frequency as well.

It is thus possible to use a control signal frequency inducing a rotation corresponding, for example, to the equivalent of one rotation per second (360° per second) in the case where the control signal represents an angular value. Such a frequency is a relatively high control frequency for the typical devices likely to make use of a method according to the invention (such as satellites, submarines, ships, airplanes, space probes, oil drilling equipment, etc.). However, such frequencies (corresponding to abrupt movements) may occasionally be reached or even exceeded by the output signal from the gyroscope, for example after a sudden air pocket for an aircraft, a very high wave for a ship, etc.

Figure 3:
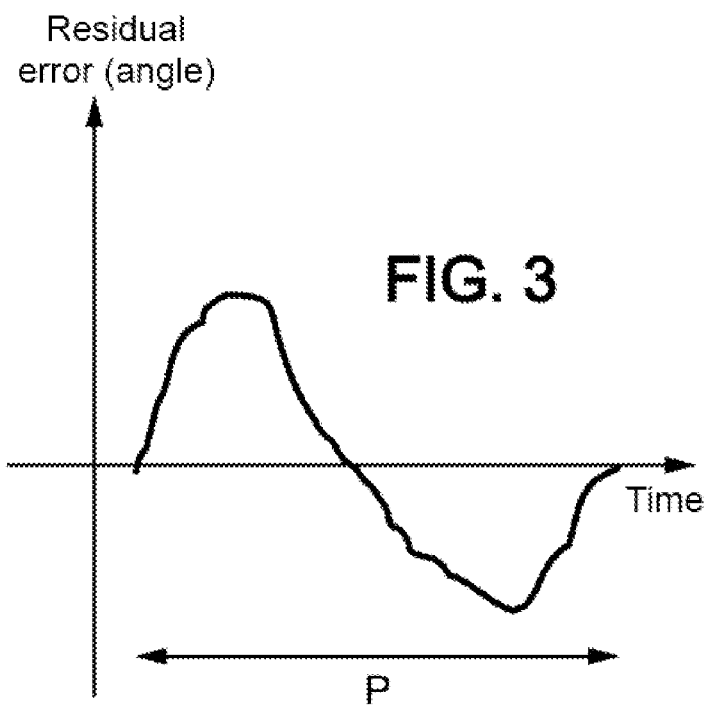
FIG. 3 illustrates a residual error corrected by a feedback loop according to an embodiment of the invention.

In step 24, errors in this original measurement signal are identified during observation periods, meaning periods during which the control signal presents a high frequency with regard to the frequency of the output signal, or relative to the movement of the carrier of the gyroscopic system. A corrected signal can thus be obtained under such conditions, due to the precession applied by the control signal which allowed averaging the errors from the vibrating gyroscope, and also due to the identification of residual errors which it was possible to determine when the control signal could be distinguished in the original measurement signal. This type of residual error is represented in FIG. 3.

More specifically, the residual errors are identified by comparing the corrected signal according to an embodiment (received in the feedback loop 26) with the control signal during the error "observability" periods.

The method may temporarily accommodate, during an identification error, a precession frequency near or even less than that of the movement of the carrier, because the error identification implemented by the method can be iterative. It is then possible to occasionally tolerate the method temporarily causing an error estimate to diverge (or at least not contribute to causing it to converge).

When a change in orientation is measured that is as fast or faster than the precession, a possible implementation of the method can also ignore the corrections issuing from the error identification, which are potentially no longer relevant because the output signal is likely to have varied quite a bit during the precession period. A possible implementation may also consist of stopping the estimations and only correcting the measured signal on the basis of the previously estimated error.

In order to detect that an error estimate is no longer reliable, for example due to too large a carrier movement frequency relative to the precession, the method may, after several successive error estimations, measure the standard deviation of these estimates and if the standard deviation exceeds a certain threshold, the method can assume that the conditions are not met for a reliable error estimate. This can be linked, for example, to an overly large movement of the carrier, which adversely affects the estimate. In such a case, it is no longer possible to separate the control signal and the signal reflecting the movement of the carrier (there are no longer two frequency domains but only one issuing from two overlapping domains), and an assumption of a frequency separation which can be advantageous for the method is no longer true, as the error estimates are then very noisy. For example, in certain embodiments, a standard deviation that exceeds three times the standard deviation encountered under normal frequency separation conditions is a sign that the error estimation is no longer to be considered reliable.

A gyroscope is not necessarily perfect, and a given control signal does not necessarily produce the exact rotation requested by the control signal. The residual errors may therefore be due, for example, to the difference between the precession actually performed and the theoretical precession which would correspond to the control signal. These residual errors can be added to the error between the precession actually performed and the measured precession with its possible measurement errors. In this case, the gyroscope measurement gives access only to the sum of the errors, and the sum of the errors is therefore averaged.

It may be appropriate not to apply precession continuously. For example, during certain phases of operation there is no need to correct the error estimate to ensure stability, for example if the temperature remains substantially constant and there are no major external excitations (low vibrations, etc.), while in certain embodiments one can consider the errors as remaining stable (precession then being superfluous). If the method still makes use of precession, this precession could be counterproductive when there are no instabilities to be corrected, as the presence of a precession can itself induce defects (for example by causing instabilities) and cause errors to appear which otherwise would not necessarily have been present and their correction would have been unnecessary.

In a possible embodiment, the correction of residual errors is based on a measurement supplied by an external element such as another gyroscope or any other means of angular measurement, such as optical, laser, etc.

Another significant source of error may be the scale factor between the applied control and the rotation actually induced. For example, the rotation could be only 98% (purely illustrative value) of what was ordered, and when subtracting the control signal from the measured signal a residual 2% of the control signal would be observed.

Control signal is understood here to mean a signal indicating a variation in angle values over time. In this case, when the measurement signal from the gyroscope corresponds to angular velocity values, the subtraction between signals can be done directly, and when the measurement signal corresponds to angle values, then the integral of the control signal is determined in order to obtain the control signal in the form of angle values to be able to subtract it from the measurement signal.

It should be noted that the another step can be carried out continuously while steps 21 and 22 are successively performed.

The measurements supplied by the gyroscopic system may then be based on this corrected signal which represents a variation in the geometric position of vibration values of the gyroscope.

Figure 4A:
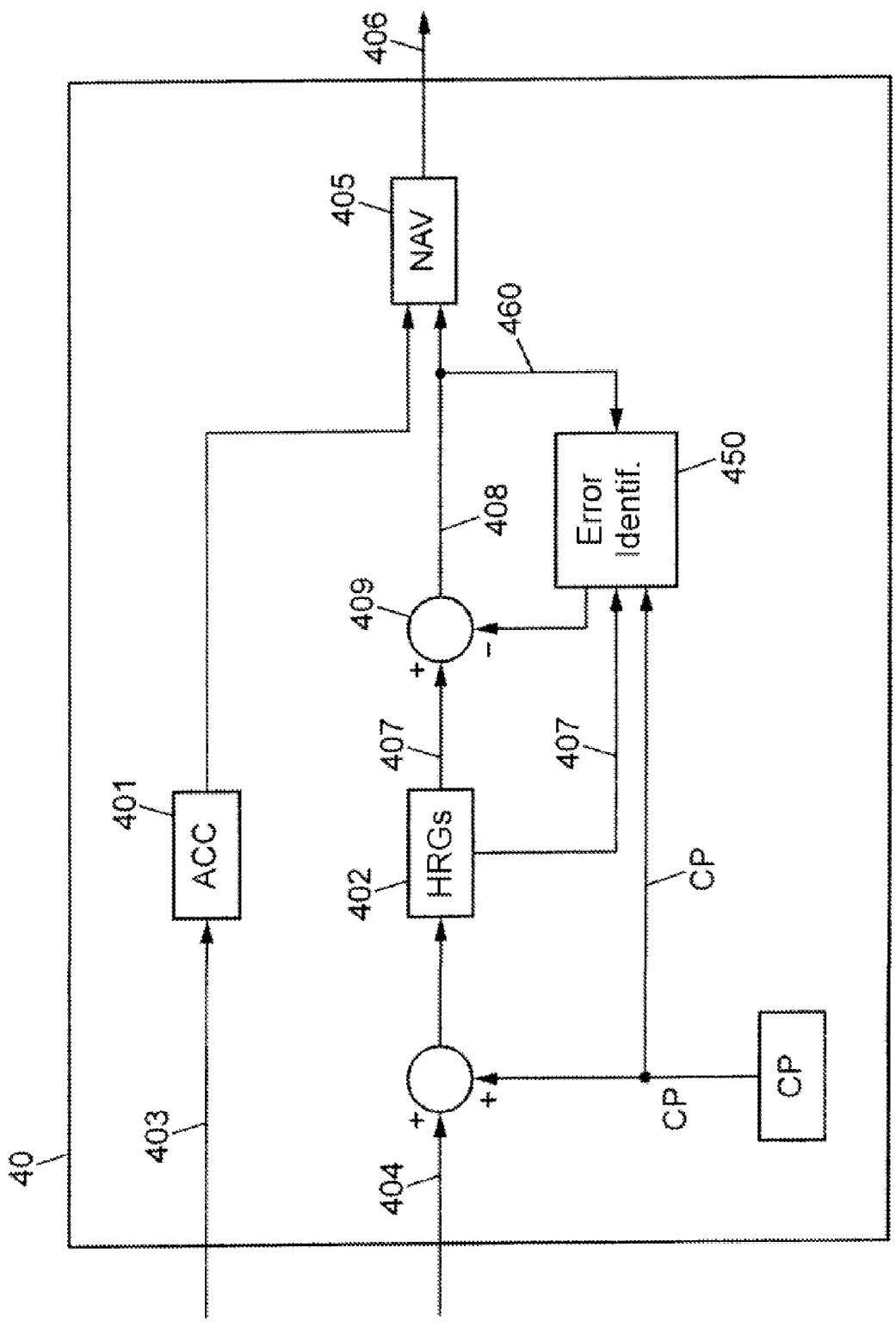
FIGS. 4-A and 4-B illustrate an architecture of a gyroscopic system according to an embodiment of the invention.
Figure 4B:
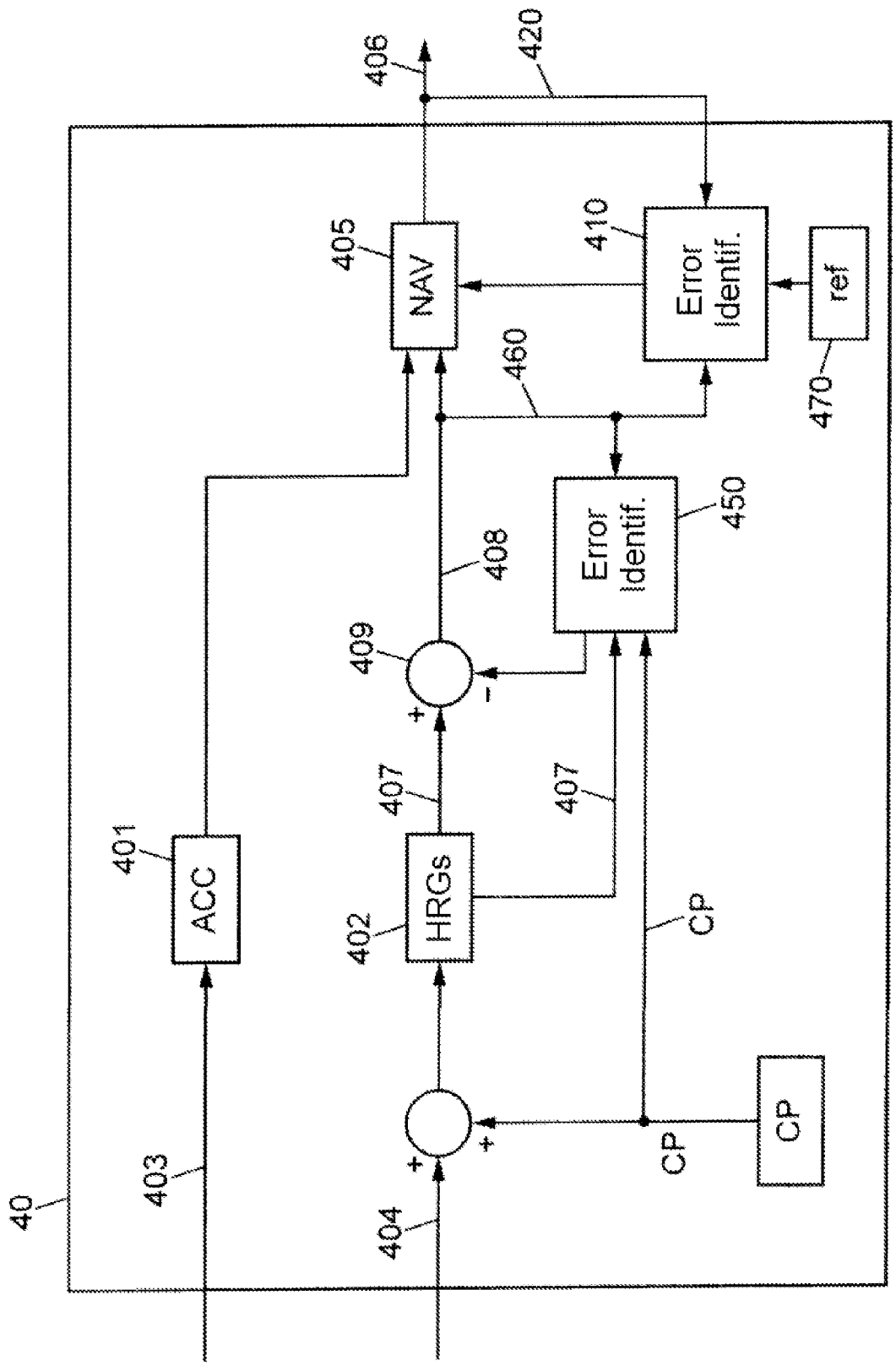

FIG. 4-A illustrates a schematic architecture of a gyroscopic system according to an embodiment of the invention.

In this embodiment, such a gyroscopic system 40 comprises three accelerometers 401, as well as three vibrating gyroscopes 402 according to an embodiment of the invention. In the gyroscopic system 40 illustrated here, an acceleration 403 is measured by the accelerometers 401 and a rotation speed 404 is measured by the vibrating gyroscopes 402. As an example, the system considered here comprises three vibrating gyroscopes, but it is easy to deduce from the following sections an embodiment of the invention in which such a system contains only one.

A navigation unit NAV 405 is responsible for processing the measurement signals from the accelerometers and from the vibrating gyroscopes, ultimately outputting 406 gyroscopic measurements such as an attitude value, a position value, and a speed value, in the form of an output signal.

In an embodiment of the invention, a control signal CP (Precession Control) is applied to each of the vibrating gyroscopes in addition to the rotation speed that each vibrating gyroscope of the system is experiencing. As a result, it should be noted that each vibrating gyroscope of the system supplies a measurement signal 407 that represents both the rotation speed it is experiencing within the system (related to the motion of the carrier) and the precession control CP or control signal applied according to an embodiment.

An error identification unit 450 is adapted to identify the errors in the measurement signal 407 (or original measurement signal). The control signal and the identified errors are subtracted from the original measurement signal from a vibrating gyroscope of the system, in a subtractor 409. A corrected signal 408 is output from the subtractor 409. This corrected signal is then supplied to the navigation entity 405 which is then able to provide reliable gyroscopic measurements on the basis of the corrected signals for each vibrating gyroscope.

More specifically, the errors are identified as a function of:
the control signal which was applied to it; and
the corrected signal received in the feedback loop 460.

On the basis of the precession, it is thus possible in the error identification unit to average the errors in the measurement signal from the vibrating gyroscope. Then, on the basis of a comparison of the original measurement signal from which the control signal has been subtracted, with the corrected signal (feedback loop), during the periods in which the control signal is high frequency relative to the output signal, one can identify the residual errors still affecting the original measurement signal (after averaging the errors by alternating precession).

FIG. 4-B illustrates another diagram of the architecture of a gyroscopic system according to an embodiment of the invention.

This gyroscopic system 40 corresponds to the one illustrated in FIG. 4-A, additionally comprising an additional error identification unit 410. This additional error identification unit is responsible for identifying errors in the corrected signal 460 as a function of a portion of the corrected signal 460 and of the output signal 406 ultimately supplied by the gyroscopic system and received at the additional error identification unit 410 via a feedback loop 420.

The method may, for example, replace the measured data with the external data if these data are deemed more reliable (for example data issuing from another gyroscope to which no precession is applied, the difference then being representative of the errors from the gyroscope that is the object of precession via the control signal).

Advantageously, a feedback loop 460 supplies the error identification unit 410 with the measurements 406 output from the gyroscopic system. This system also comprises a reference measurement entity 470 adapted to supply reference measurements of the carrier movement. These reference measurements may correspond to zero movement. Such is the case in an alignment phase of a navigation unit. This reference measurement entity may correspond to a GPS, for example, particularly when applying the measurement method during movement of the carrier to which the gyroscopic system is attached.

This error identification unit additionally receives the partially corrected signal 408 from the vibrating gyroscope concerned. This error identification unit 410 is then responsible for comparing these signals with reference measurements supplied by a reference measurement entity 470, in order to further reduce residual errors according to an embodiment of the invention.

Figure 5:
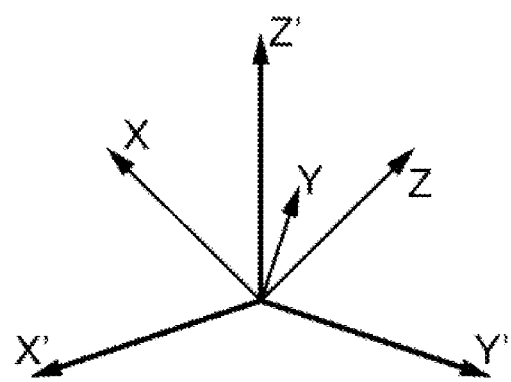
FIG. 5 illustrates a configuration of a gyroscopic system according to an embodiment of the invention.

FIG. 5 illustrates an arrangement of a gyroscopic system according to an embodiment of the invention. More specifically, the axes X, Y and Z represent the axes of the triad of three vibrating gyroscopes in a gyroscopic system according to an embodiment of the invention. The trisection of this triad X, Y, and Z is then advantageously oriented vertically, unlike the other triad X', Y' and Z' also represented in this FIG. 5.

Figure 6:
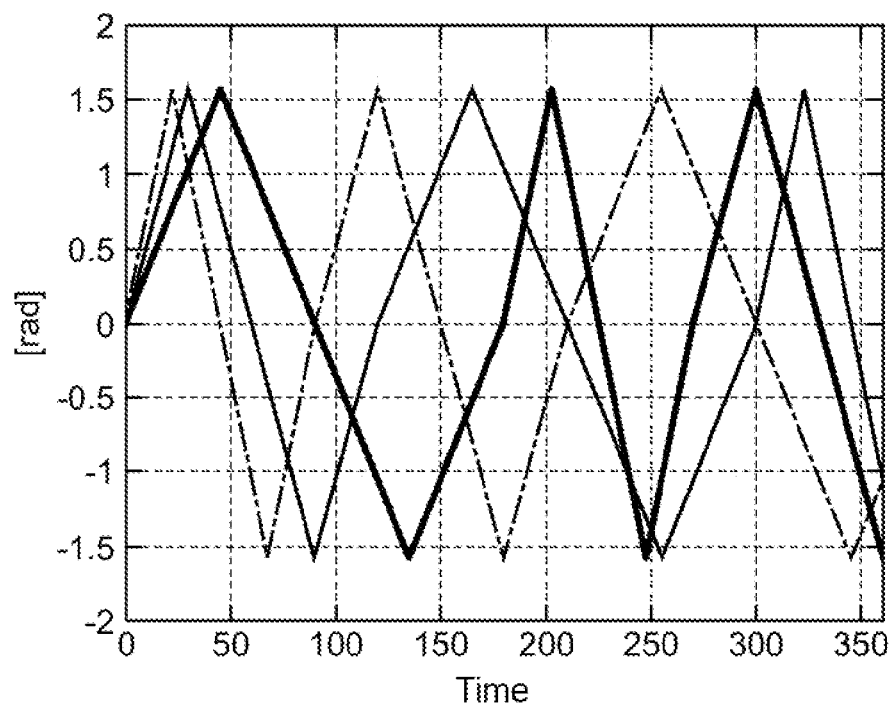
FIG. 6 illustrates an application of phase-shifted control signals according to an embodiment of the invention.

FIG. 6 illustrates an application of modulated control signals according to an embodiment of the invention. Such a difference advantageously allows decorrelating the respective errors connected to the measurement signals supplied by the vibrating gyroscopes.

Figure 7:
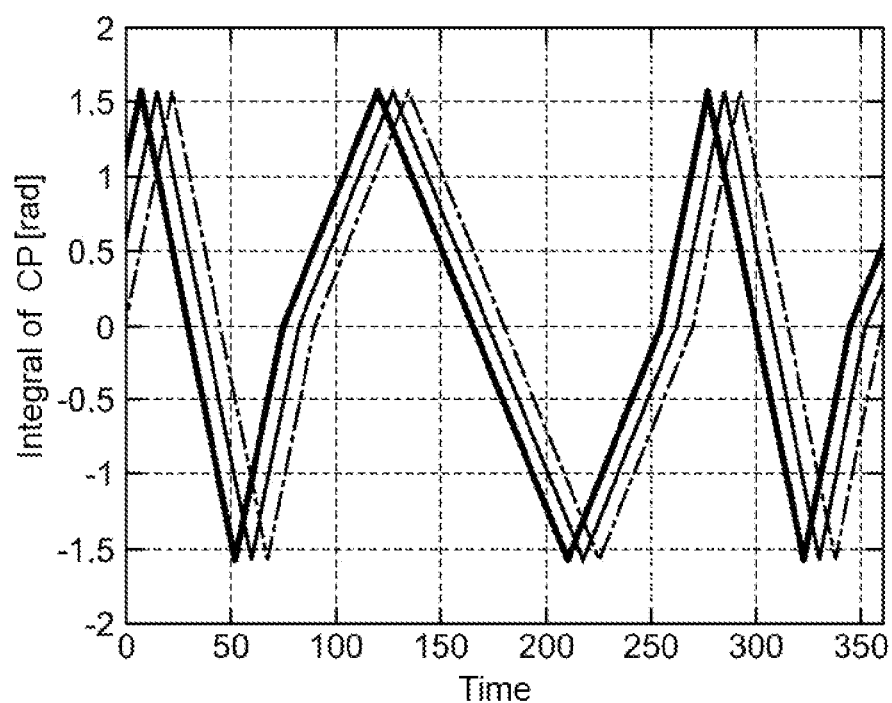
FIG. 7 illustrates an application of modulated control signals according to an embodiment of the invention.

FIG. 7 illustrates an application of phase-shifted control signals applied according to an embodiment of the invention. In this embodiment, the control signals respectively applied to the different vibrating gyroscopes are not in phase with each other. Such a difference also advantageously allows decorrelating the respective errors connected to the measurement signals supplied by the vibrating gyroscopes.

No limitation is placed on the difference that can be introduced between the control signals to be applied to the vibrating gyroscopes in order to be able to separate the respective errors connected to the measurements supplied by the vibrating gyroscopes.

Figure 8:
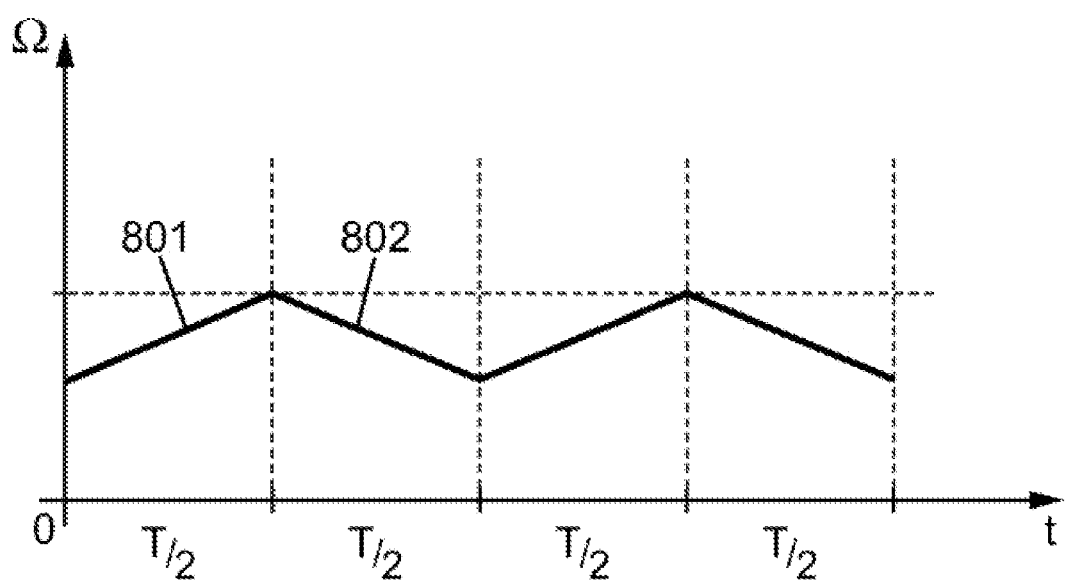
FIG. 8 illustrates first and second speed profiles over time, according to an embodiment of the invention.

FIG. 8 illustrates first and second speed profiles according to an embodiment of the invention. FIG. 8 illustrates the control signal over time, meaning the variation in the angular velocity Ω over time. Here, the angular velocity corresponding to the control signal for changing the geometric position of vibration of the gyroscope increases continuously over the first portion of the control signal and decreases, symmetrically and in the same manner as it increased, over the second portion of the period of the control signal. Thus portion 801 illustrates the first speed profile and portion 802 illustrates the second speed profile, these two speed profiles being temporally inverted relative to each other.

Then, for illustrative purposes only, the first and second speed profiles indicate a zero speed variation over time, or in other words a constant speed value.

The invention claimed is:

1. Method of gyroscopic measurement in the form of an output signal supplied by a gyroscopic system comprising a vibrating gyroscope;
    said gyroscope vibrating in a first initial geometric position of vibration and supplying an original measurement signal;
    wherein a periodic control signal is applied to the vibrating gyroscope over a time period comprising a first portion of the time period and a second portion of the time period, in order to:
    rotate the geometric position of vibration in a first direction, during the first portion of the time period, according to a first speed profile, causing a change in the position of the vibration of said gyroscope from the first geometric position of vibration to a second geometric position of vibration; and
    rotate the geometric position of vibration in a second direction opposite to the first direction, during the second portion of the time period, according to a second speed profile, causing a change in the position of the vibration of said gyroscope from the second geometric position of vibration to a third geometric position of vibration;
    the first and second speed profiles generating a variation in the speed of the change of geometric position of vibration over time;
    said output signal being based on a corrected signal issuing from the original measurement signal;
    wherein the control signal has a zero mean over the time period; and
    wherein the corrected signal is based on error identification conducted by comparing the control signal with the corrected signal from an immediately previous iteration.

2. Method of measurement according to claim 1, wherein the gyroscopic system additionally comprises an external measurement entity, and
    wherein the error identification takes into account measurements supplied by the external measurement entity.

3. Method of measurement according to claim 1, wherein the control signal presents signal portions of high frequency relative to the output signal; and
    wherein the error identification is conducted during the high frequency signal portions.

4. Method of measurement according to claim 3, wherein, the gyroscopic system additionally comprising an external measurement entity,
    the error identification takes into account measurements supplied by the external measurement entity during the signal portions of the control signal which are not high frequency relative to the output signal.

5. Method of measurement according to claim 3, wherein the high frequency signal portions in the control signal correspond to reversals of direction of the control signal.

6. Method of measurement according to claim 3, wherein the gyroscopic system additionally comprises a second vibrating gyroscope as the external measurement entity; and
    wherein an additional control signal is applied to the second vibrating gyroscope, said additional control signal presenting signal portions of high frequency relative to the output signal, which are time-shifted relative to the high frequency signal portions of the control signal that is applied to the first vibrating gyroscope.

7. Method of measurement according to claim 1, wherein the gyroscopic system comprises, in addition to the first vibrating gyroscope, second and third vibrating gyroscopes each supplying an original measurement signal,
    wherein respective periodic control signals are applied over a time period to each of the second and third vibrating gyroscopes, the time period comprising a first portion of the time period and a second portion of the time period, in order to:
    rotate the geometric position of vibration in a first direction, during the first portion of the time period, according to a first speed profile, causing a change in the position of vibration from the first geometric position of vibration to a second geometric position of vibration; and
    rotate the geometric position of vibration in a second direction opposite to the first direction, during the second portion of the time period, according to a second speed profile, causing a change in the position of vibration from the second geometric position of vibration to a third geometric position of vibration;
    said control signals having a zero mean over said time period and presenting signal portions of high frequency relative to the output signal which are time-shifted relative to each other;
    said output signal being based on corrected signals respectively issuing from intermediate measurement signals;
    wherein each of the corrected signals is based on error identification conducted, during the high frequency signal portions of the corresponding control signal, by comparing the corresponding original measurement signal from which the corresponding control signal has been subtracted, with the corresponding corrected signal.

8. Method of measurement according to claim 7, wherein each of said respective corrected signals for each of the vibrating gyroscopes is additionally obtained by taking into account errors identified on the basis of comparing the output signal supplied by the gyroscopic signal as a function of the position of vibration, with reference measurements.

9. Method of measurement according to claim 8, wherein the reference measurements are supplied by an external measurement signal.

10. Method of measurement according to claim 7, wherein the error identification is determined, for each of the vibrating gyroscopes, on the basis of a Kalman filter given as parameters the position of vibration of the vibrating gyroscope, the control signal, and the output signal supplied by the gyroscopic system.

11. Method of measurement according to claim 7, wherein the first, second, and third vibrating gyroscopes are positioned in a triad having a trisection oriented on a substantially vertical axis.

12. Method of measurement according to claim 7, wherein the first and second speed profiles are different for each of the vibrating gyroscopes of the gyroscopic system, these differences allowing the errors associated with the measurements from the three gyroscopes to be decorrelated from each other.

13. Method of gyroscopic measurement according to claim 7, wherein the second speed profile corresponds to the inverse of the first speed profile as a function of time.

14. Gyroscopic system comprising:
a vibrating gyroscope, said gyroscope vibrating in a first initial geometric position of vibration and supplying an original measurement signal;
a control unit adapted to apply a periodic control signal over a time period comprising a first portion of the time period and a second portion of the time period, in order to:
rotate the geometric position of vibration in a first direction, during a portion of the time period, according to a first speed profile, causing a change in the position of the vibration of said gyroscope from the first geometric position of vibration to a second geometric position of vibration; and
rotate the geometric position of vibration in a second direction opposite to the first direction, during the second portion of the time period, according to a second speed profile, causing a change in the position of vibration of said gyroscope from the second geometric position of vibration to a third geometric position of vibration,
a processing unit adapted to supply an output signal on the basis of a corrected signal representing a variation in the geometric position of vibration values and obtained by subtracting the control signal from the original measurement signal supplied by the vibrating gyroscope;
the first and second speed profiles generating a variation in the speed of the change in geometric position of vibration over time;
said control signal having a zero mean over said time period;
said output signal being based on a corrected signal issuing from the original measurement signal;
wherein the corrected signal is based on error identification conducted by comparing the corrected signal with the original measurement signal from which the control signal has been subtracted.

15. Gyroscopic system according to claim 14, additionally comprising an external measurement entity, and
wherein the measurements supplied by the external measurement entity are taken into account for the error identification.

16. Gyroscopic system according to claim 14, wherein the control signal presents signal portions of high frequency relative to the output signal; and
wherein the error identification is conducted during the high frequency signal portions.

17. Gyroscopic system according to claim 14, additionally comprising a second vibrating gyroscope as the external measurement entity;
wherein an additional control signal is applied to the additional gyroscope, said additional control signal presenting signal portions of high frequency relative to the output signal, which are time-shifted relative to the high frequency signal portions of the control signal applied to the vibrating gyroscope of the system.

18. Gyroscopic system according to claim 14, comprising, in addition to the first vibrating gyroscope, second and third vibrating gyroscopes which each supply an original measurement signal,
wherein respective periodic control signals are applied over a time period to each of the second and third vibrating gyroscopes, via the control unit, the time period comprising a first portion of the time period and a second portion of the time period in order to:
rotate the geometric position of vibration in a first direction, during a portion of the time period, according to a first speed profile, causing a change in the position of vibration from the first geometric position of vibration to a second geometric position of vibration; and
rotate the geometric position of vibration in a second direction opposite the first direction, during the other portion of the time period, according to a second speed profile, causing a change in the position of vibration from the second geometric position of vibration to a third geometric position of vibration;
said control signal having a zero mean over said time period and presenting signal portions of high frequency relative to the output signal which are time-shifted relative to each other;
said output signal being based on corrected signals respectively issuing from intermediate measurement signals;
wherein each of the corrected signals is based on error identification conducted, during the high frequency signal portions of the corresponding control signal, by comparing the corresponding original measurement signal from which the corresponding control signal has been subtracted, with the corresponding corrected signal.

* * * * *